United States Patent [19]
Willhite

[11] Patent Number: 6,116,933
[45] Date of Patent: Sep. 12, 2000

[54] CARD READER

[75] Inventor: Jimmy David Willhite, Orange, Calif.

[73] Assignee: ITT Manufacturing Enterprises, Inc., Wilmington, Del.

[21] Appl. No.: 09/176,793

[22] Filed: Oct. 22, 1998

[51] Int. Cl.⁷ .............................. H01R 13/15; H01R 13/62
[52] U.S. Cl. ........................... 439/260; 439/267; 235/441
[58] Field of Search ..................................... 439/260, 267; 235/441

[56] References Cited

U.S. PATENT DOCUMENTS

| | | |
|---|---|---|
| 4,835,375 | 5/1989 | Shimamura et al. . |
| 4,936,790 | 6/1990 | De La Cruz . |
| 5,051,566 | 9/1991 | Pernet . |
| 5,120,946 | 6/1992 | Hug et al. . |
| 5,173,596 | 12/1992 | Kapinos et al. . |
| 5,670,769 | 9/1997 | Pernet . |
| 5,703,346 | 12/1997 | Bricaud et al. . |
| 5,729,000 | 3/1998 | Sugimoto . |
| 5,775,929 | 7/1998 | Hashiguchi . |
| 5,780,827 | 7/1998 | Zolkos et al. . |
| 6,015,311 | 1/2000 | Benjamin et al. .................. 439/267 |

*Primary Examiner*—Harold I. Pitts
*Attorney, Agent, or Firm*—Thomas L. Peterson

[57] ABSTRACT

A card reader for receiving a smart card (12), has a minimum number of special molded parts, with the parts easily assembled. The card reader includes a molded main enclosure (30) with bottom and side walls (71,73,75,77), a circuit assembly (32) that includes a plate-like frame (40) that holds a smart card connector (42) with contacts for engaging pads on the card, and a front device (34). The frame (40) is formed by a simple circuit board with the smart card connector and an I/O connector (44) mounted on the board and connected by traces (56) on the board. The board is installed on the main enclosure by placing the rear end (70) of the board under a tab (74) of the enclosure and pivoting down the board while pegs (84) on the enclosure are received in locating holes (80) drilled in the rear end of the board. The front device Is then installed on the main enclosure and pivoted down and locked into position, with a tab (120) on the device lying over the front end (72) of the circuit board to hold it down, and with pegs (124) depending from the tab, entering locating holes (126) at the front of the circuit board.

11 Claims, 4 Drawing Sheets

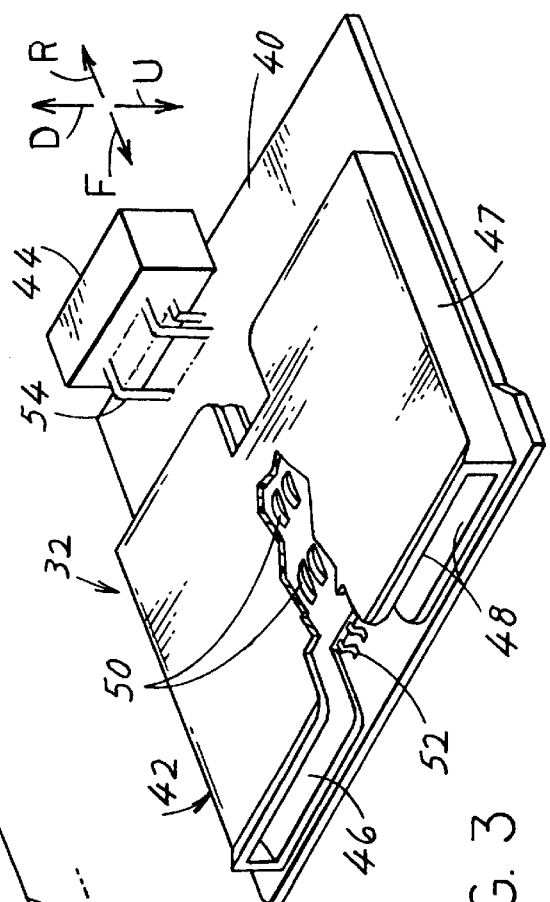
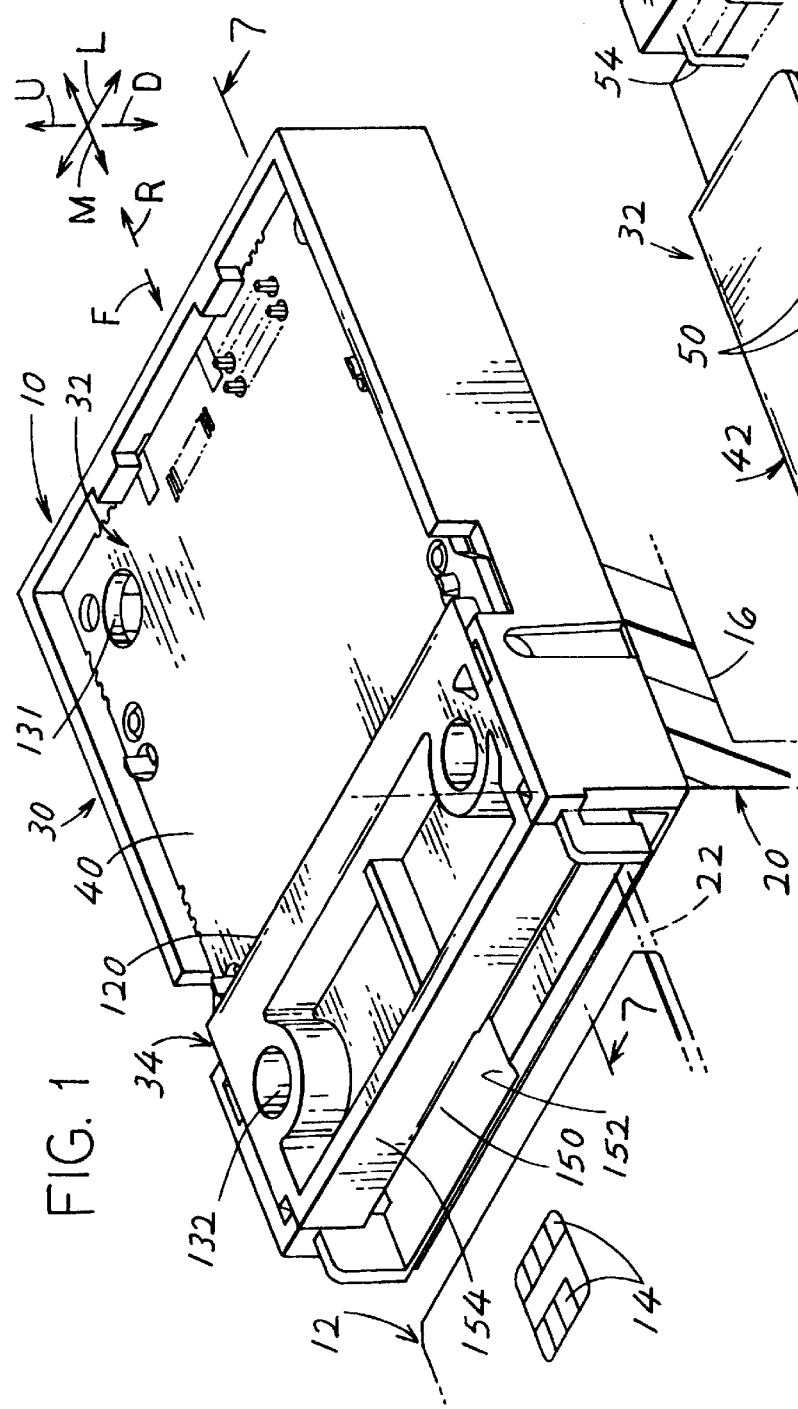
FIG. 1
FIG. 3

CARD READER

BACKGROUND OF THE INVENTION

A common type of smart card is of the shape and size of a credit card, but has pads on a surface that connect to a thin chip embedded in the card. Such cards can be read out and written into by a card connector that has a slot for receiving the card and that has contacts for engaging the pads of a card inserted into the slot. An example of such a card connector is shown in U.S. Pat. No. 5,703,346. A card reader which contains such a card connector, includes an enclosure for protecting the card connector, for forming an entry way slot portion that guides cards into the card connector, for providing a mount for mounting the card reader to a supporting device, and for providing an I/O (input/output) connector for connecting the contacts to a cable leading to read/write circuitry. Prior card readers for holding such a card connector have included numerous specially molded parts which were time-consuming to assemble and which resulted in a card reader with a weak card entry way, all resulting in an expensive and only moderately reliable card reader. A card reader which was formed of a minimum number of specially molded parts, with the parts easily and rapidly assembled, and with a robust card entry way, would be of value.

SUMMARY OF THE INVENTION

In accordance with one embodiment of the present invention, a card reader is provided for supporting a card connector, making connections to a cable, and providing an entry way, in a construction that uses a minimum number of parts and a minimum of specially molded parts, and which allows the parts to be very easily assembled. The card reader includes a main enclosure having a bottom wall and side walls and having front and rear portions. A circuit assembly which includes the smart card connector and an I/O connector, is mounted in the rear portion of the main enclosure, and a front device is mounted at the front of the main enclosure. The circuit assembly includes a simple circuit board on which the smart card connector and I/O connector are mounted. The main enclosure has a tab at its rear that lies over the rear of the circuit board to hold it down, with support surfaces of the main enclosure having upstanding pegs that project into locating holes in the rear portion of the circuit board. The front device has a tab that overlies the front of the circuit board to hold it down when the front device is installed. The front device has a front end that forms a pin-and-socket joint in conjunction with the front of the main enclosure, so the front device can be pivoted down until it locks in place and its tab overlies the front of the circuit board. The front of the circuit board preferably has holes that receive pegs depending from the tab on the front device.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front isometric view of a smart card reader of the present invention shown fully assembled and mounted on a card-receiving machine.

FIG. 3 is an upside-down isometric view, partially in section, of the connector assembly of FIG. 2.

DESCRIPTION OF THE PREFERRED EMBODIMENTS

Figure 2:
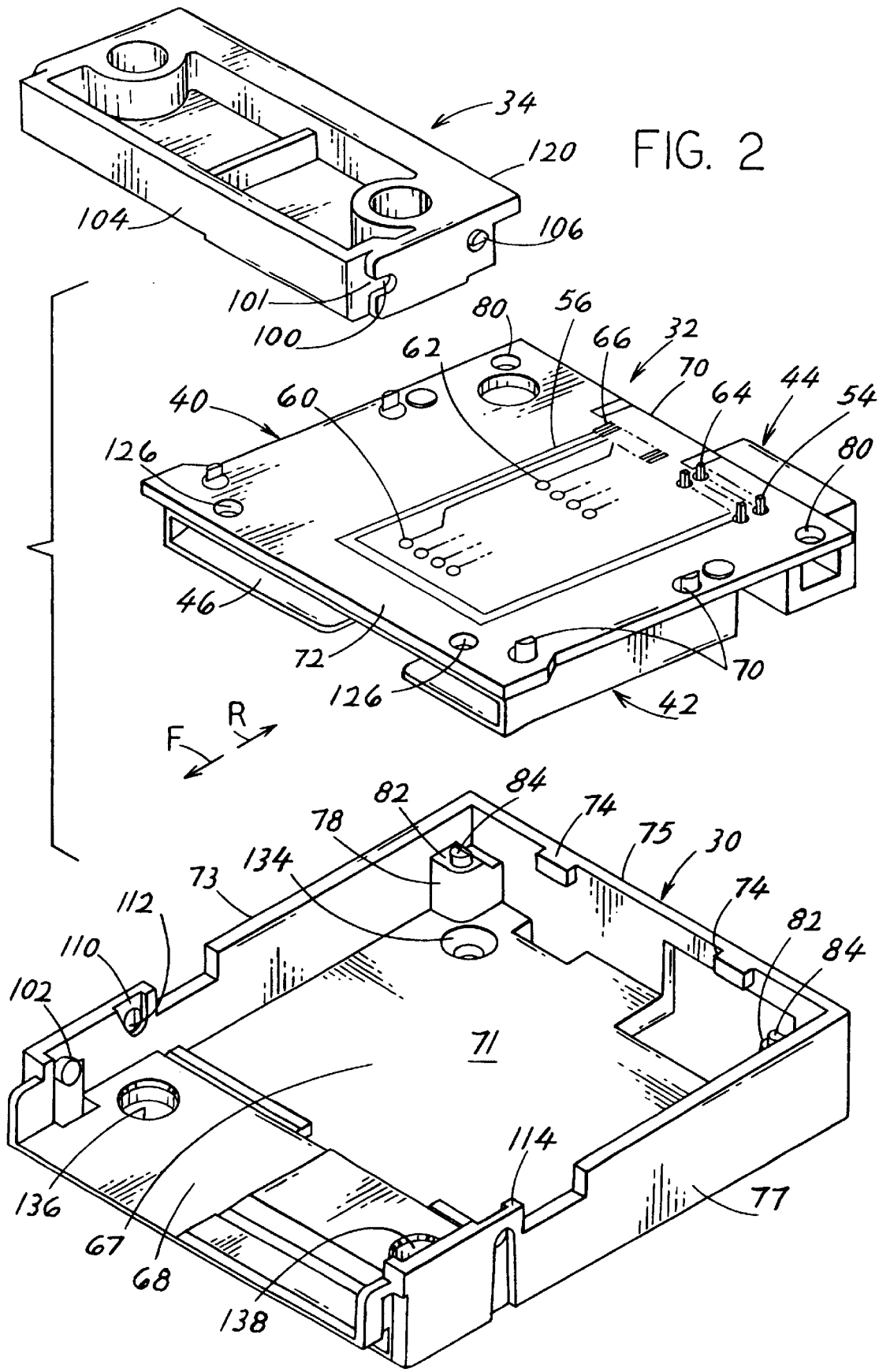
FIG. 2 is an exploded front isometric view of the smart card reader of FIG. 1.

FIG. 1 illustrates a smart card reader 10 which is designed to receive a smart card 12 and engage contact pads 14 on a surface of the smart card. The smart card reader 10 is designed to be mounted on a horizontal wall 16 of a card receiving machine 20 which has an opening at its front end through which the front of the card reader is accessible, so the card can be moved rearwardly along a card path 22 into the reader.

The card reader includes three main parts or assemblies, including a main enclosure 30, a circuit assembly 32, and a front locking assembly and card guide device 34. FIG. 2 shows that the connector assembly 32 includes a largely plate-like frame 40, a smart card connector 42 mounted on the frame 40, and an I/O (input and output) connector 44 that is also mounted on the frame 40. The smart card connector 42 has a slot 46 that receives the front end of the smart card. FIG. 3 shows the connector assembly 32 in an upside-down orientation from that shown in FIG. 2. The smart card connector has an insulative housing 47 with guide walls 48 that guide the card along the card path. The connector 42 has several contacts 50 that project into the slot 46 to engage the contact pads of the smart card. The contacts have connection ends 52 that are connected through traces on the plate-like frame 40 to terminals 54 of the 110 connector 44. Referring again to FIG. 2, it can be seen that the plate-like frame 40 is formed of a section of a circuit board, with electrically conductive traces 56 that connect each of the contact connector ends to one the terminals of the I/O connector. In particular, plated-through holes 60, 62 on the board can receive the connector ends 52 (FIG. 3) of the smart card connector contacts. The traces lead to plated-through holes 64 (FIG. 2) where the terminals 54 of the connector 44 lie. The traces also extend to a row of surface-mount pads 66 where a connector can be mounted to connect to a flat flexible cable. Projections 70 mount the smart card connector on the circuit board.

Figure 4:
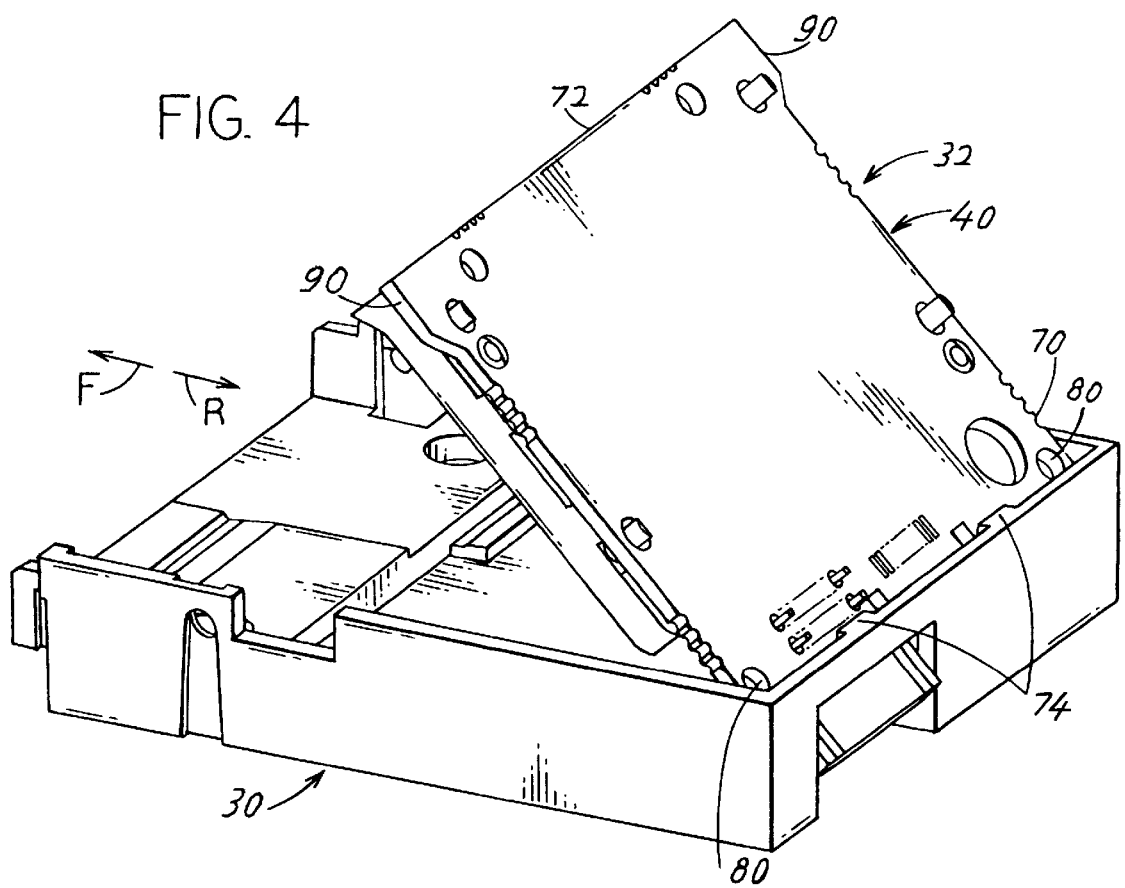
FIG. 4 is a rear isometric view showing the connector assembly being mounted on the main enclosure.
Figure 5:
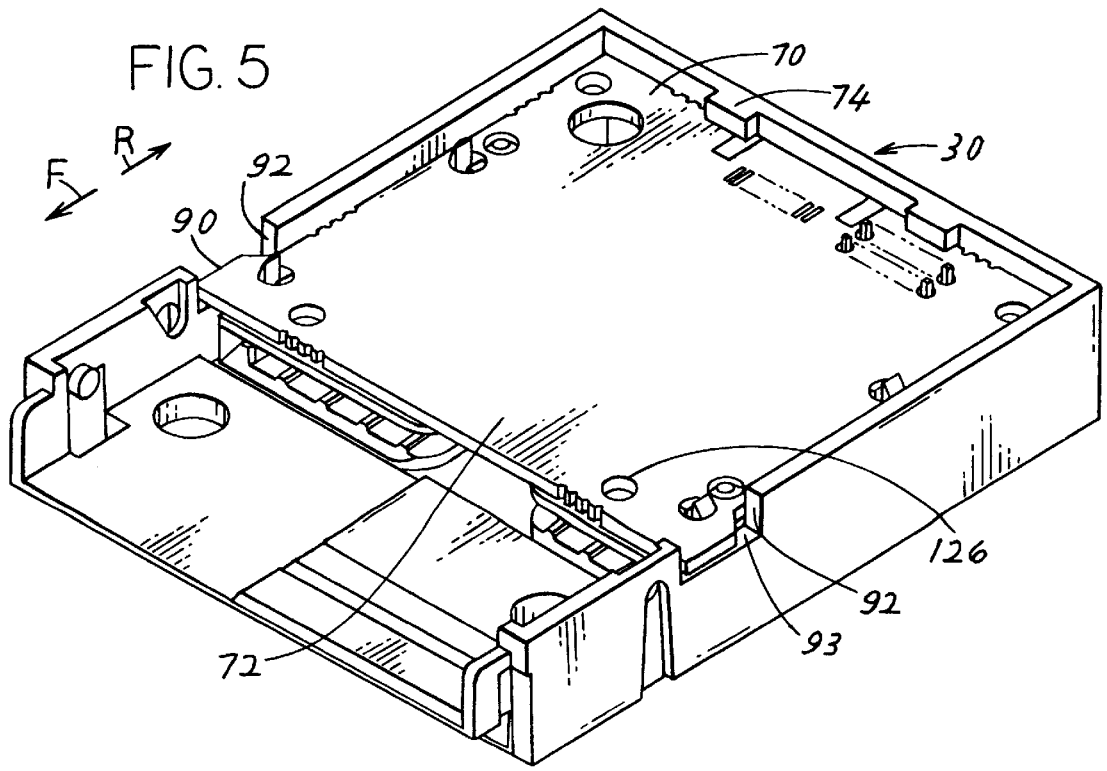
FIG. 5 is a front isometric view of the assembly of FIG. 4, with the connector assembly in its final position on the main enclosure.

To assemble the components, applicant first orients the connectorassembly, 32 as shown in FIG. 4, so the circuit board 40 is inclined by about 45°, with its rear end 70 lowermost and its front end 72 uppermost. This allows the rear end 70 of the board to be projected under tabs 74 at the top of the rear side wall of the main enclosure 30, so when the connector assembly is pivoted down until the circuit board is horizontal, the rear end 70 will be prevented from lifting up. The circuit board rear end also has a pair of locating holes 80. As shown in FIG. 2, the main enclosure 30 has a bottom wall 71 and side walls 73, 75, 77 that form a cavity, and has front and rear portions 67, 68. Platforms 78 form support surfaces 82 that support the rear portion of the circuit board. Upwardly-projecting pegs 84 project into the locating holes 80 at the rear of the circuit board when the circuit board is moved down to the horizontal to be parallel to the horizontal bottom wall 71. The combination of the hold-down tabs 74 and the pegs 84, prevent movement of the connector assembly when it is installed as shown in FIG. 4, and then pivoted down to the orientation shown in FIG. 5. The circuit board 40 of FIG. 4 has a pair of sideward projections 90 at its front end, that are formed by properly cutting the circuit board. As shown in FIG. 5, the projections 90 move into locating slots 92 formed in the side walls of the main enclosure 30 and rest on slot bottom surfaces 93.

Figure 6:
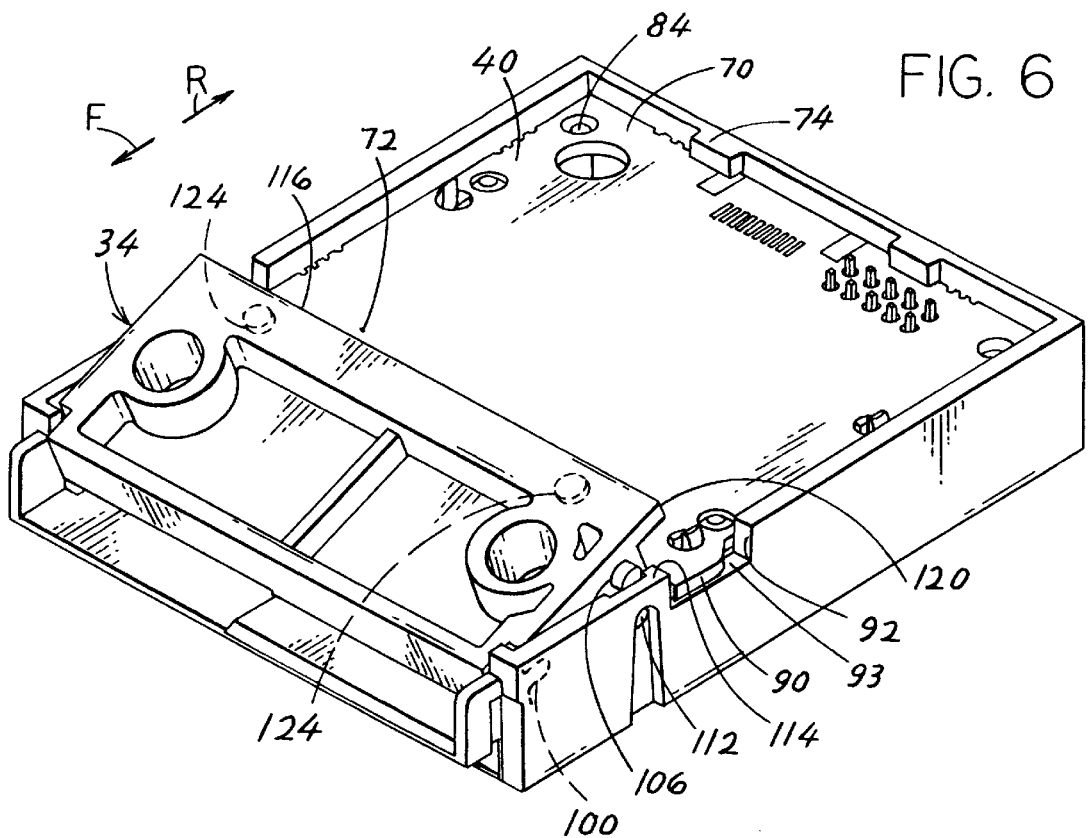
FIG. 6 is a front isometric view of the assembly of FIG. 5, but also showing the front device as it is being installed on the combination of main enclosure and connector assembly.

The front device 34 shown in FIG. 2, includes sockets 100 at either side with forwardly-opening gaps 101 that can receive front pins 102 at the front of the main enclosure. The sockets 100 and pins 102 pivotally support the front end 104 of the front device on the front end of the main enclosure 30 in a pin-and-socket joint. The front device has a pair of latches 106 in the form of laterally-projecting rear pins, that can be moved down along grooves 110 and snapped into holes 112 in the main enclosure side walls. The front device is installed, as shown in FIG. 6, by first orienting it at an incline so its sockets 100 of FIG. 2 can receive the front pins 102 of the main enclosure. The inclined orientation of FIG. 6 avoids interference between the rear pins 106 of the front device and front wall portions 114 on the main enclosure. With the front device 34 in the position of FIG. 6, the rear 116 of the front device is forcefully pushed down to move the rear pins 106 down until they snap and lock into the holes 112. During such downward movement of the rear end 116 of the front device, a hold-down tab 120 of the front device moves down over the front end 72 of the circuit board 40 to hold down the front end of the circuit board so that it cannot lift up, that is, so the sideward projections 90 of the circuit board cannot lift up out of the locating slots 92. In addition, the front device has a pair of pegs 124 that depend from the tab 120 and that are positioned to enter locating holes 126 (FIG. 2) at the front of the circuit board. Thus, the front of the circuit board is not only held down, but is closely located in position, relative to the front device.

When the card reader is fully assembled, as shown in FIG. 1, it can be fastened to the horizontal wall 16 of the card-receiving machine 20, by projecting three screws through upper holes 131–133 and into corresponding holes 134–138 (FIG. 2) in the enclosure bottom wall 71. The screws are screwed into the horizontal wall 16 (FIG. 1) by a screwdriver projected through the holes 131–133. With the card reader fully assembled as shown in FIG. 1, the card connector 42 of FIG. 3 is protected, because the circuit board 40 covers almost all of the cavity formed within the main enclosure 30, and because the front device 34 covers the area forward of the card connector, except for a card entry way 150.

Figure 7:
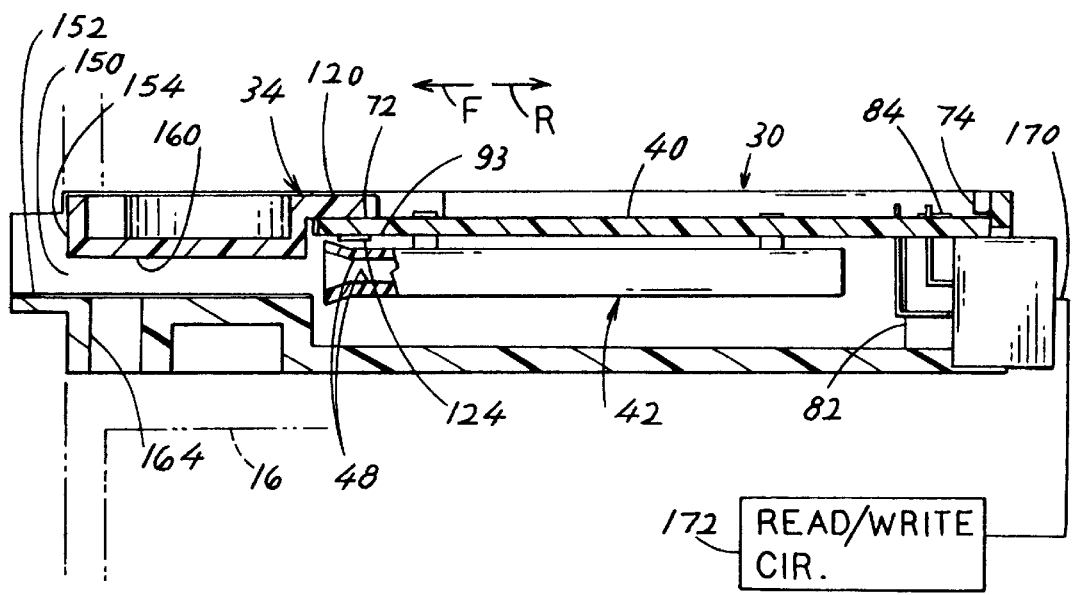
FIG. 7 is a sectional view taken on line 7—7 of FIG. 1.

The entry way 150 provides a platform surface 152 on which the rear end of the card 12 is laid before pushing it rearward into the card reader. The platform 152 projects forward of the front device forward end 154 by a plurality of millimeters (preferably about 4 mm). The front device 34 is a robust molded part with a front end 154 that is held down by the pivot joint (100, 102 in FIG. 2). The front end 154 should be robust in order to avoid damage by vandals who might try to pry open the entry way. FIG. 7 shows the top and bottom walls 160, 152 of the entry way. The entry way 150 formed between the front device 34 and the front of the main enclosure, is aligned with the card connector 42 that is mounted on the circuit board. This is because the front of the circuit board 40 is sandwiched between the front device tab 120 and the enclosure slot bottom surface 93. The entry way preferably includes at least one slot 164 for catching debris. The platform 152 preferably projects by a plurality of millimeters forward of the front end 154 of the front device.

The I/O connector can detachably mate to another connector at 170 that leads to read/write circuitry 172.

While the above description includes directional words such as "upper", "lower" and "horizontal" to help describe the invention as illustrated, the card reader can be used in any orientation with respect to the Earth.

Thus, the invention provides a card reader of relatively simple and robust construction, which uses a minimum of dedicated molded parts and which is easily assembled. The reader includes a main enclosure with a bottom wall and upstanding side walls, a connector assembly which holds a smart card connector and an I/O connector and connects the contacts and terminals of the two connectors, and a front device which forms an entry way (with the main enclosure) and which helps hold down the connector assembly. The connector assembly is preferably formed from a piece of a circuit board that has traces that connect contacts of the smart card connector to terminals of the I/O connector. The main enclosure has tabs at its rear end that overlie a cavity formed between the bottom wall and side walls, to prevent lift-up of the circuit board when it is installed, with board-supporting surfaces supporting the rear of the board and pegs projecting up through locating holes in the rear portion of the board. The front device has a tab that holds down the front of the board when the front device is installed on the main enclosure. The front device also has downwardly extending pegs that project into locating holes at the front of the circuit board. The front device and the front of the main enclosure form pin-and-socket pivot joints that allow the front device to pivot so its rear end moves down until it locks into position on the main enclosure.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A card reader for receiving a portion of a smart card lying along a card path, and for engaging card pads on a surface of the smart card, comprising:

a main enclosure having a bottom wall and side walls, and having front and rear portions;

a circuit assembly which includes a largely plate-like frame, that has front and rear ends and that is mountable on said rear portion of said main enclosure, and a smart card connector mounted on said platelike frame, where said smart card connector has an insulable housing with guides for guiding movement of the card along said card path and a plurality of contacts mounted on said housing for engaging said card pads;

a front device which is mountable on said front portion of said main enclosure;

said rear portion of said main enclosure having a hold-down tab for holding down said rear end of said plate-like frame, and said front device having a hold-down tab for holding down said front end of said plate-like frame when said front device is mounted on said main enclosure.

2. The card reader described in claim 1 wherein:

said front and rear ends of said plate-like frame each have at least one locating hole;

said main enclosure rear portion has a rear end with at least one upstanding peg that projects up into said locating hole in said rear end of said plate-like frame;

said hold-down tab of said front device has a peg that projects down into said locating hole In said front end of said plate-like frame.

3. The card reader described in claim 1 wherein:

said circuit assembly includes an I/O connector mounted on said plate-like member, with said I/O connector having a plurality of terminals;

said plate-like member consists of a circuit board with a plurality of electrically-conductive traces thereon, with each of said traces connected to one of said contacts and to one of said terminals.

4. The card reader described in claim 1 wherein:

said main enclosure front portion forms the bottom of an entry way that leads to said card connector with said front device forming the top of said entry way, and said main enclosure front portion forms a platform on which the front end of a card can be laid prior to moving the card rearward along said card path.

5. The card reader described in claim 1 wherein:

said front device has laterally opposite sides with a socket at each side including a forwardly-opening socket gap, and said main enclosure has laterally opposite sides with front pins that can engage said sockets by moving through said gaps;

said front device has sidewardly-projecting rear pins lying rearward of said sockets, and said enclosure has a pair of holes for receiving said rear pins when said rear pins move down to snap into said holes as said front device pivots on said front pins, with said hold-down tab of said front device lying at the rear of said front device.

6. A card reader comprising:

a main enclosure having a bottom wall and side walls, forming a cavity;

a circuit assembly which includes a frame, a smart card connector mounted on said frame with said card connector having a plurality of contacts, and an I/O connector mounted on said frame with said I/O connector having a plurality of terminals;

said frame being mounted on said main enclosure at a location above said bottom wall, with said card connector lying under said frame;

said frame comprising a circuit board having electrically conductive traces connecting said contacts of said smart card connector to said terminals of said I/O connector.

7. The card reader described in claim 6 wherein:

said circuit board lies in a plane that is parallel to said bottom wall and closes the top of said cavity;

said smart card connector lies under said circuit board, in said cavity.

8. The card reader described in claim 6 wherein:

said main enclosure includes front and rear portions and said circuit board has front and rear board ends, and including;

a front device which has a mechanism that locks to said main enclosure front portion when said front device is moved down to an installed position against said main enclosure front portion;

said main enclosure rear portion has a board support with an upwardly-facing surface and has a hold-down tab that lies immediately above said circuit board when said circuit board lies on said board support;

said front device includes a hold-down tab that lies over said circuit board front portion when said front device lies in its installed position.

9. The card reader described in claim 8 wherein:

said circuit board front and rear ends have locating holes, said board support has an upwardly projecting peg that projects up into one of said locating holes, and said front device tab has a downwardly-projecting peg that projects down into one of said locating holes.

10. A method for constructing a card reader, comprising:

molding a main enclosure having a bottom wall lying in a horizontal plane and having upstanding side walls all forming a cavity, with said main enclosure having board-supporting surfaces spaced above said bottom wall with at least one upwardly-projecting peg thereon, and with a main enclosure rear end having a hold-down tab lying above said board-supporting surfaces;

forming a circuit board with front and rear ends so said board fits within said side walls and on said board-supporting surfaces to close the top of said cavity, and so said circuit board has a hole for receiving said upwardly-projecting peg, and attaching a smart card connector to a bottom of said circuit board to form a circuit assembly;

orienting said circuit assembly so said board extends at an incline to the plane of said bottom wall with said board rear end lying under said hold-down tab and said board front end being uppermost, and pivoting said board by moving down said board front end so said board hole receives said peg and said board lies on said board-supporting surfaces, with said smart card connector lying under said circuit board in said cavity;

moving down a front device that has a device tab, to an installed position to lock the front device onto said main enclosure, including lowering said device tab over said circuit board front end to hold down said circuit board front end.

11. The method described in claim 10 wherein:

said main enclosure and said front device each form pin and socket pivot joint parts at a location forward of said device tab, said socket of said joint parts having a gap that is oriented to allow said front device to be moved forward and downward while said front device extends at an incline to its installed position, to engage said joint parts with each other in a pin and socket joint;

after said joints parts are engaged while said front device extends at said incline, pivoting said front device to said installed position to move said device tab down against said circuit board front end, and then locking a rear location on said front device which lies rearward of said joint parts to said main enclosure.

* * * * *